A. W. GRIFFITH.
GEARING.
APPLICATION FILED DEC. 6, 1919.

1,345,847.

Patented July 6, 1920.
2 SHEETS—SHEET 1.

WITNESS
R. A. Balderson

INVENTOR
A. W. Griffith
by Bakewell Byrnes Parmelee
his Attys.

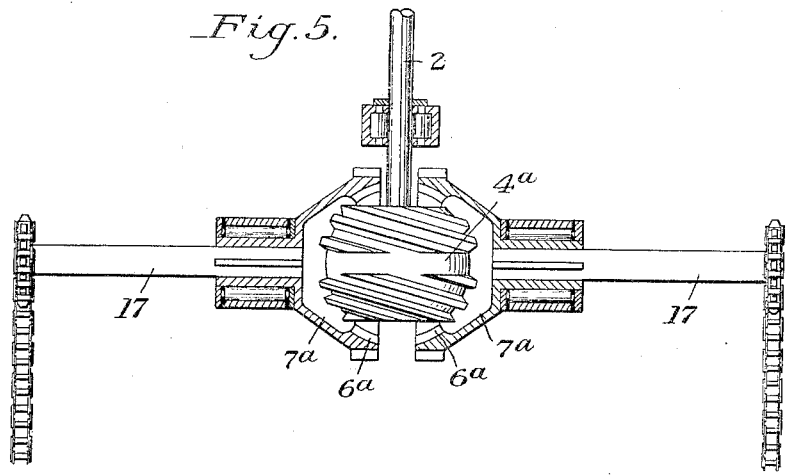
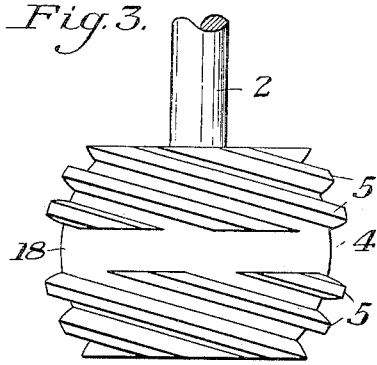
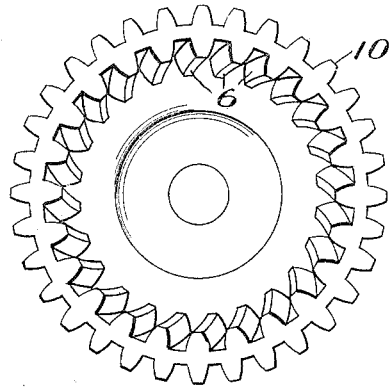

UNITED STATES PATENT OFFICE.

ALBERT W. GRIFFITH, OF PITTSBURGH, PENNSYLVANIA.

GEARING.

1,345,847.  Specification of Letters Patent.  Patented July 6, 1920.

Application filed December 6, 1919. Serial No. 342,916.

*To all whom it may concern:*

Be it known that I, ALBERT W. GRIFFITH, a citizen of the United States, residing at Pittsburgh, Allegheny county, Pennsylvania, have invented a new and useful Improvement in Gearing, of which the following is a full, clear, and exact description, reference being had to the accompanying drawings, forming part of this specification, in which—

Fig. 3 is a detail view of the ball worm.

Fig. 4 is a face view of one of the gear members, and

Fig. 5 is a sectional plan view showing a modification.

Figure 1:
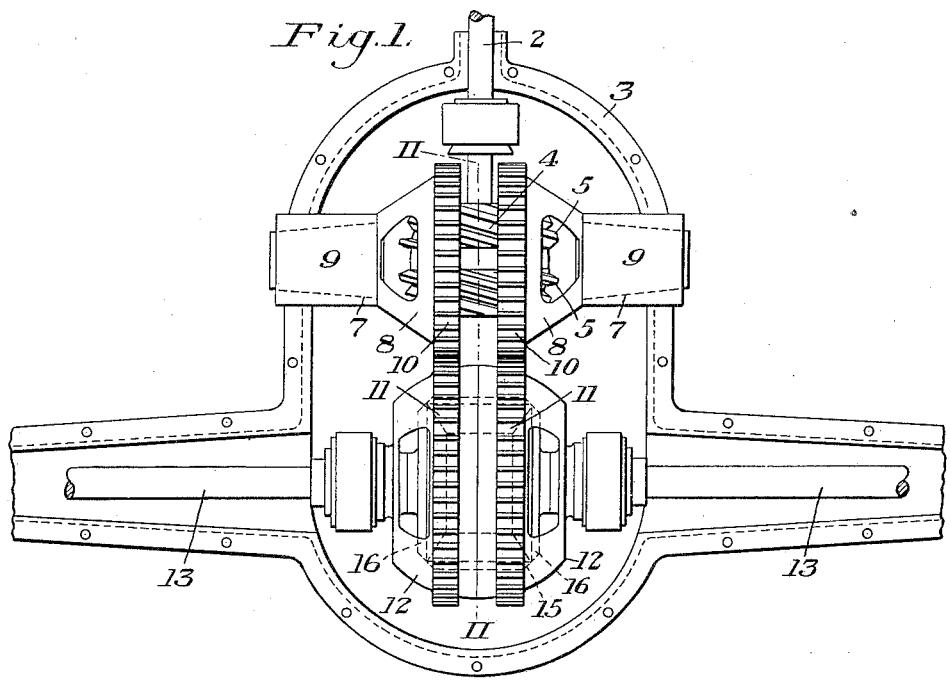
Figure 1 is a plan view, with a portion of the casing removed, of gearing embodying my invention.
Figure 2:
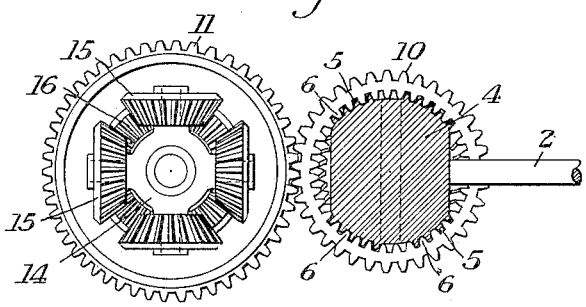
Fig. 2 is a section on the line II—II of Fig. 1.

My invention has relation to gearing and is designed to provide a novel form of gearing, which, while it may be used for other purposes, is more particularly designed as a drive for motor trucks and the like. The invention is also designed to provide gearing of this character which is capable of transmitting a large amount of power and which will be generally efficient in its operation.

The nature of my invention will be best understood by reference to the accompanying drawings, in which I have illustrated the same and which will now be described, it being premised that various changes can be made in the details of construction, arrangement and combination of the various parts, without departing from the spirit and scope of my invention as defined in the appended claims.

In these drawings, the numeral 2 designates a driving shaft which is driven in any usual or suitable manner. 3 designates a gear casing or housing into which the shaft 2 is extended. Rigidly secured to the inner end of said shaft is a ball worm 4. This is in the form of a sphere truncated at opposite poles and having worm teeth 5 formed thereon. These teeth mesh with internal worm teeth 6 of two gear members 7 whose axes are at right angles to the axis of the shaft 2 and worm 4, and which are in the form of rings carried by the extended hub portions 8 mounted in suitable bearings 9 in the casing 3. Said members are also each provided with an external spur gear 10. These spur gears mesh with and drive two spur gears 11 which are secured to the casing members 12 of a differential. These casing members 12 are loosely mounted on the axle sections 13 to be driven and carry the differential spider 14, upon which are mounted the planetary bevel gears 15. These bevel gears mesh with bevel gears 16 which are rigidly secured to the axle sections.

Instead of the particular differential which I have herein shown and described, I may use other forms of differentials capable of being actuated by the external gears 10 of the gear members 8.

Instead of employing a differential I may, in some cases, arrange the ball worm to form a direct drive. This is illustrated in Fig. 5 in which the ball worm 4ª meshes with the internal worm teeth 6ª of two gear sections 7ª. These sections are keyed to the shaft sections 17 from which power may be taken in any desired manner, or which may themselves constitute the power shafts to be driven. In the form of ball worm shown, the teeth, instead of being continuous, are broken at the central zone of the ball or sphere, as indicated at 18.

My invention provides a gear drive which is extremely simple and which, owing to the double drive effected by the worm is very powerful in its action, being capable of transmitting heavy loads without danger of breaking.

I claim:

1. Gearing comprising a driving shaft, a ball member secured thereto and having worm teeth thereon, and two gear members having internal worm teeth which mesh with the worm teeth of the ball member at opposite sides of its axis, the teeth of each gear member engaging the teeth of the ball member at substantially diametrically opposite sides thereof, substantially as described.

2. Gearing comprising a driving shaft having a ball member secured thereto and formed with external worm teeth, two gear members mounted to rotate on axes at right angles to the axis of said shaft and ball members, said gear members having internal worm teeth engaging the teeth of the ball member at opposite sides of its axis, the teeth of each gear member engaging the teeth of the ball member at two opposite sides of said ball member, substantially as described.

3. Gearing comprising a driving shaft having a ball member secured thereto and formed with external worm teeth, two gear members mounted to rotate on axes at right angles to the axis of said shaft and ball members, said gear members having internal worm teeth engaging the teeth of the ball member at opposite sides of its axis, said gear members also having external gear teeth and a differential driven by said external teeth, substantially as described.

4. Gearing comprising a driven shaft having a ball member secured thereto and formed with external worm teeth, two gear members mounted to rotate on axes at right angles to the axis of said shaft and ball members, said gear members having internal worm teeth engaging the teeth of the ball member at opposite sides of its axis, and a differential having two sets of spur gears meshing with and driven by the external teeth of said gear members, substantially as described.

5. Gearing, comprising a driving shaft, a ball member secured thereto and having worm teeth thereon, and two gear members each having internal worm teeth which mesh with the worm teeth of the ball member, the diameter of the pitch line of the teeth of said internal gear members being substantially equal to the diameter of the pitch line of the teeth of said ball member, substantially as described.

6. Gearing, comprising a driving shaft, a ball member secured thereto and having worm teeth thereon, and two gear members having internal worm teeth which mesh with the worm teeth of the ball member at opposite sides of the axis, the axis of rotation of said ball member intersecting the axes of rotation of the gear members, substantially as described.

7. Gearing comprising a driving shaft, a ball member secured thereto and having worm teeth thereon, and two gear members having internal worm teeth which mesh with the worm teeth of the ball member at opposite sides of its axis, the teeth of each gear member engaging the teeth of the ball member at substantially diametrically opposite sides thereof and being at all times in effective driving engagement therewith, substantially as described.

In testimony whereof I have hereunto set my hand.

ALBERT W. GRIFFITH.